United States Patent
Shapira et al.

(10) Patent No.: US 9,609,070 B2
(45) Date of Patent: Mar. 28, 2017

(54) EXTENDING OUTDOOR LOCATION BASED SERVICES AND APPLICATIONS INTO ENCLOSED AREAS

(71) Applicant: CORNING OPTICAL COMMUNICATIONS WIRELESS LTD, Airport (IL)

(72) Inventors: Isaac Shapira, Petach Tikva (IL); Yair Zeev Shapira, Shoham (IL); Catherine Zatloukal, North Potomac, MD (US)

(73) Assignee: Corning Optical Communications Wireless Ltd, Airport City (IL)

( * ) Notice: Subject to any disclaimer, the term of this patent is extended or adjusted under 35 U.S.C. 154(b) by 0 days.

(21) Appl. No.: 14/157,785

(22) Filed: Jan. 17, 2014

(65) Prior Publication Data
US 2014/0135038 A1    May 15, 2014

Related U.S. Application Data

(63) Continuation of application No. 12/809,603, filed as application No. PCT/IB2008/055478 on Dec. 21, 2008, now Pat. No. 8,644,844.
(Continued)

(51) Int. Cl.
*H04L 29/08* (2006.01)
*G01S 19/48* (2010.01)
(Continued)

(52) U.S. Cl.
CPC .............. *H04L 67/18* (2013.01); *G01S 19/48* (2013.01); *H04L 67/14* (2013.01); *H04L 67/16* (2013.01); *H04W 4/02* (2013.01); *H04W 64/00* (2013.01)

(58) Field of Classification Search
CPC ..... H04W 64/00; H04W 4/02; H04W 88/085; H04L 67/14; H04L 67/16; H04L 67/18; G01S 19/48
See application file for complete search history.

(56) References Cited

U.S. PATENT DOCUMENTS 5,602,903 A    2/1997    LeBlanc et al. ................ 379/60
5,873,040 A    2/1999    Dunn et al. .................... 455/456
(Continued)

FOREIGN PATENT DOCUMENTS

AU    2010100320 A4    6/2010    .............. G01S 3/02
JP    2009288245        12/2009    .............. G01S 1/80
(Continued)

OTHER PUBLICATIONS

Girard, et al., Indoor Pedestrian Navigation Using Foot-Mounted IMU and Portable Ultrasound Range Sensors, www.mdpi.com/journal/sensors, Aug. 2, 2011, pp. 7606-7624.
(Continued)

*Primary Examiner* — Marcos Torres
(74) *Attorney, Agent, or Firm* — C. Keith Montgomery

(57) ABSTRACT

Methods and systems for indoor mobile unit positioning, for seamlessly toggling a mobile unit positioning between outdoor positioning and indoor positioning and for providing location based services or application generated by and external location server to the mobile unit while the mobile unit is indoors. The indoor mobile unit positioning includes mobile unit-based positioning with makes use of reception of access point signals by the mobile unit.

12 Claims, 9 Drawing Sheets

Related U.S. Application Data

(60) Provisional application No. 61/008,313, filed on Dec. 20, 2007.

(51) Int. Cl.
  *H04W 4/02* (2009.01)
  *H04W 64/00* (2009.01)

(56) References Cited

U.S. PATENT DOCUMENTS

| | | | |
|---|---|---|---|
| 6,236,365 B1 | 5/2001 | LeBlanc et al. | 342/457 |
| 6,249,252 B1 | 6/2001 | Dupray | 342/450 |
| 6,876,945 B2 | 4/2005 | Emord | 702/150 |
| 6,909,399 B1 | 6/2005 | Zegelin et al. | 342/463 |
| 6,952,181 B2 | 10/2005 | Karr et al. | 342/457 |
| 7,084,758 B1 | 8/2006 | Cole | 340/539.11 |
| 7,183,910 B2 | 2/2007 | Alvarez et al. | 340/539.13 |
| 7,194,275 B2 | 3/2007 | Bolin et al. | 455/456.6 |
| 7,298,327 B2 | 11/2007 | Dupray et al. | 342/451 |
| 7,315,735 B2 | 1/2008 | Graham | 455/404.1 |
| 7,336,942 B2 | 2/2008 | Wang | |
| 7,336,961 B1 | 2/2008 | Ngan | 455/456.1 |
| 7,395,181 B2 | 7/2008 | Foxlin | 702/155 |
| 7,525,484 B2 | 4/2009 | Dupray et al. | 342/450 |
| 7,535,796 B2 | 5/2009 | Holm et al. | 367/100 |
| 7,599,796 B2 | 10/2009 | Tsai et al. | |
| 7,698,228 B2 | 4/2010 | Gailey et al. | 705/64 |
| 7,714,778 B2 | 5/2010 | Dupray | 342/357.01 |
| 7,751,971 B2 | 7/2010 | Chang et al. | 701/207 |
| 7,764,231 B1 | 7/2010 | Karr et al. | 342/457 |
| 7,848,765 B2 | 12/2010 | Phillips et al. | 455/456.3 |
| 7,860,518 B2 | 12/2010 | Flanagan et al. | 455/456.1 |
| 7,860,519 B2 | 12/2010 | Portman et al. | |
| 7,903,029 B2 | 3/2011 | Dupray | 342/457 |
| 7,970,648 B2 | 6/2011 | Gailey et al. | 705/14.49 |
| 7,996,281 B2 | 8/2011 | Alvarez et al. | 705/27.2 |
| 8,005,050 B2 | 8/2011 | Scheinert et al. | 370/335 |
| 8,032,153 B2 | 10/2011 | Dupray et al. | 455/456.1 |
| 8,072,381 B1 | 12/2011 | Ziegler | 342/386 |
| 8,073,565 B2 | 12/2011 | Johnson | 700/245 |
| 8,081,923 B1 | 12/2011 | Larsen et al. | 455/18 |
| 8,082,096 B2 | 12/2011 | Dupray | 701/207 |
| 8,090,383 B1 | 1/2012 | Emigh et al. | 455/456.1 |
| 8,135,413 B2 | 3/2012 | Dupray | 455/456.1 |
| 8,213,264 B2 | 7/2012 | Lee et al. | 367/127 |
| 8,326,315 B2 | 12/2012 | Phillips et al. | 455/456.1 |
| 8,364,171 B2 | 1/2013 | Busch | 455/456.1 |
| 8,774,843 B2 | 7/2014 | Mangold et al. | 455/456.1 |
| 2002/0046259 A1* | 4/2002 | Glorikian | 709/218 |
| 2003/0146871 A1 | 8/2003 | Karr et al. | 342/457 |
| 2003/0157943 A1 | 8/2003 | Sabat, Jr. | 455/456 |
| 2004/0102196 A1* | 5/2004 | Weckstrom et al. | 455/456.1 |
| 2004/0198386 A1 | 10/2004 | Dupray | 455/456.1 |
| 2004/0246926 A1 | 12/2004 | Belcea et al. | 370/332 |
| 2005/0020309 A1 | 1/2005 | Moeglein et al. | 455/456.1 |
| 2005/0064877 A1* | 3/2005 | Gum et al. | 455/456.1 |
| 2005/0102180 A1 | 5/2005 | Gailey et al. | 705/14 |
| 2005/0143091 A1 | 6/2005 | Shapira et al. | 455/456.1 |
| 2005/0153712 A1 | 7/2005 | Osaka et al. | 455/456.5 |
| 2006/0014548 A1 | 1/2006 | Bolin et al. | 455/456.1 |
| 2006/0025158 A1 | 2/2006 | Leblanc et al. | 455/456.2 |
| 2006/0209752 A1 | 9/2006 | Wijngaarden et al. | 370/328 |
| 2006/0276202 A1 | 12/2006 | Moeglein et al. | 455/456.1 |
| 2007/0104128 A1 | 5/2007 | Laroia et al. | 370/329 |
| 2007/0104164 A1 | 5/2007 | Laroia et al. | 370/338 |
| 2007/0140168 A1 | 6/2007 | Laroia et al. | 370/330 |
| 2007/0202844 A1 | 8/2007 | Wilson et al. | 455/404.2 |
| 2007/0253355 A1 | 11/2007 | Hande et al. | 371/328 |
| 2007/0268853 A1 | 11/2007 | Ma et al. | 370/328 |
| 2008/0077326 A1 | 3/2008 | Funk et al. | 701/207 |
| 2008/0119208 A1 | 5/2008 | Flanagan et al. | 455/456.6 |
| 2008/0167049 A1 | 7/2008 | Karr et al. | 455/456.2 |
| 2008/0194226 A1 | 8/2008 | Rivas et al. | 455/404.2 |
| 2008/0201226 A1 | 8/2008 | Carlson et al. | 705/14 |
| 2008/0270522 A1 | 10/2008 | Souissi | 709/203 |
| 2009/0073885 A1 | 3/2009 | Jalil et al. | 370/241 |
| 2009/0163224 A1 | 6/2009 | Dean et al. | 455/456.1 |
| 2009/0176507 A1 | 7/2009 | Wu et al. | 455/456.2 |
| 2009/0191891 A1 | 7/2009 | Ma et al. | 455/456.1 |
| 2010/0007485 A1 | 1/2010 | Kodrin et al. | 340/539.13 |
| 2010/0121567 A1 | 5/2010 | Mendelson | 701/206 |
| 2010/0128568 A1 | 5/2010 | Han et al. | 367/99 |
| 2010/0130233 A1 | 5/2010 | Parker | 455/456.3 |
| 2010/0151821 A1 | 6/2010 | Sweeney et al. | 455/410 |
| 2010/0178936 A1 | 7/2010 | Wala et al. | 455/456.2 |
| 2010/0234045 A1 | 9/2010 | Karr et al. | 455/456.1 |
| 2010/0273504 A1 | 10/2010 | Bull et al. | 455/456.1 |
| 2010/0277365 A1 | 11/2010 | Ha et al. | |
| 2010/0287011 A1 | 11/2010 | Muchkaev | 705/7 |
| 2010/0291949 A1 | 11/2010 | Shapira et al. | 455/456.1 |
| 2010/0309752 A1 | 12/2010 | Lee et al. | 367/99 |
| 2011/0019999 A1 | 1/2011 | George et al. | 398/58 |
| 2011/0028157 A1 | 2/2011 | Larsen | 455/456.1 |
| 2011/0028161 A1 | 2/2011 | Larsen | 455/456.1 |
| 2011/0035284 A1 | 2/2011 | Moshfeghi | 705/14.58 |
| 2011/0050501 A1 | 3/2011 | Aljadeff | 342/387 |
| 2011/0086614 A1 | 4/2011 | Brisebois et al. | 455/411 |
| 2011/0103360 A1 | 5/2011 | Ku et al. | |
| 2011/0124347 A1 | 5/2011 | Chen et al. | 455/456.1 |
| 2011/0159876 A1 | 6/2011 | Segall et al. | 45/442 |
| 2011/0159891 A1 | 6/2011 | Segall et al. | 455/456.3 |
| 2011/0171912 A1 | 7/2011 | Beck et al. | 455/67.11 |
| 2011/0171946 A1 | 7/2011 | Soehren | 455/418 |
| 2011/0171973 A1 | 7/2011 | Beck et al. | 455/456.2 |
| 2011/0210843 A1 | 9/2011 | Kummetz | 340/517 |
| 2011/0244887 A1 | 10/2011 | Dupray et al. | 455/456.2 |
| 2011/0279445 A1 | 11/2011 | Murphy et al. | 345/419 |
| 2011/0312340 A1 | 12/2011 | Wu et al. | 455/456.1 |
| 2012/0028649 A1 | 2/2012 | Gupta et al. | 455/456.1 |
| 2012/0039320 A1 | 2/2012 | Lemson et al. | 370/338 |
| 2012/0046049 A1 | 2/2012 | Curtis et al. | 455/456.3 |
| 2012/0058775 A1 | 3/2012 | Dupray et al. | 455/456.1 |
| 2012/0072106 A1 | 3/2012 | Han et al. | 701/410 |
| 2012/0081248 A1 | 4/2012 | Kennedy et al. | 342/118 |
| 2012/0084177 A1 | 4/2012 | Tanaka et al. | 705/26.41 |
| 2012/0087212 A1 | 4/2012 | Vartanian et al. | 367/118 |
| 2012/0095779 A1 | 4/2012 | Wengrovitz et al. | 705/3 |
| 2012/0108258 A1 | 5/2012 | Li | 455/456.1 |
| 2012/0130632 A1 | 5/2012 | Bandyopadhyay et al. | 701/446 |
| 2012/0135755 A1 | 5/2012 | Lee et al. | 455/456.2 |
| 2012/0158297 A1 | 6/2012 | Kim et al. | 701/516 |
| 2012/0158509 A1 | 6/2012 | Zivkovic et al. | 705/14.58 |
| 2012/0179548 A1 | 7/2012 | Sun et al. | 705/14.58 |
| 2012/0179549 A1 | 7/2012 | Sigmund et al. | 705/14.58 |
| 2012/0179561 A1 | 7/2012 | Sun et al. | 705/26.3 |
| 2012/0196626 A1 | 8/2012 | Fano et al. | 455/456.3 |
| 2012/0215438 A1 | 8/2012 | Liu et al. | 701/409 |
| 2012/0221392 A1 | 8/2012 | Baker et al. | 705/14.17 |
| 2012/0232917 A1 | 9/2012 | Al-Khudairy et al. | 705/2 |
| 2012/0243469 A1 | 9/2012 | Klein | 370/328 |
| 2012/0303446 A1 | 11/2012 | Busch | 705/14.45 |
| 2012/0303455 A1 | 11/2012 | Busch | 705/14.57 |
| 2012/0310836 A1 | 12/2012 | Eden et al. | 705/44 |
| 2013/0006663 A1 | 1/2013 | Bertha et al. | 705/3 |
| 2013/0006849 A1 | 1/2013 | Morris | 705/39 |
| 2013/0036012 A1 | 2/2013 | Lin et al. | 705/14.58 |
| 2013/0040654 A1 | 2/2013 | Parish | 455/456.1 |
| 2013/0045758 A1 | 2/2013 | Khorashadi et al. | 455/456.3 |
| 2013/0046691 A1 | 2/2013 | Culton | 705/44 |
| 2013/0066821 A1 | 3/2013 | Moore et al. | 706/45 |
| 2013/0073336 A1 | 3/2013 | Heath | 705/7.29 |
| 2013/0073377 A1 | 3/2013 | Heath | 705/14.39 |
| 2013/0073388 A1 | 3/2013 | Heath | 705/14.53 |
| 2013/0073422 A1 | 3/2013 | Moore et al. | 705/26.7 |
| 2013/0080578 A1 | 3/2013 | Murad et al. | 709/217 |
| 2013/0084859 A1 | 4/2013 | Azar | 455/435.1 |
| 2013/0322415 A1 | 12/2013 | Chamarti et al. | 370/338 |
| 2014/0323150 A1 | 10/2014 | Mangold et al. | 455/456.1 |

FOREIGN PATENT DOCUMENTS

| | | |
|---|---|---|
| KR | 695208 B1 | 3/2007 |
| KR | 993332 B1 | 11/2010 |
| WO | 2001058195 A1 | 8/2001 |

(56) References Cited

FOREIGN PATENT DOCUMENTS

| WO | 2008082930 A2 | 7/2008 | |
|---|---|---|---|
| WO | WO2008/099383 A2 | 8/2008 | ............... H04B 7/04 |
| WO | WO2008/099390 A3 | 8/2008 | ............... G01S 3/02 |
| WO | WO2009/081376 A3 | 7/2009 | ............ H04W 24/00 |
| WO | WO2009/097237 A1 | 8/2009 | ............... G01S 1/68 |
| WO | WO2011/017700 A1 | 2/2011 | ............... H04B 7/02 |
| WO | WO2011/091859 A1 | 8/2011 | ............ H04W 64/00 |
| WO | WO2011/123336 A1 | 10/2011 | ............. H04B 10/12 |

OTHER PUBLICATIONS

Kim, et al, "Smartphone-Based Collaborative and Autonomous Radio Fingerprinting," IEEE Transactions on Systems, Man, and Cybernetics—Part C: Applications and Reviews, vol. 42, No. 1, Jan. 2012, pp. 112-122.

Mokni, et al., "Couples sonar inertial navigation system for pedestrian tracking," 8 pages.

"Safe Campus Solutions: Going Beyond Emergency Notification," www.alcatel-lucent.com, 8 pages.

"Cellular Specialties Introduces the First Simulcasted In-building Location-Based Tracking Solution," http://smart-grid.tmcnet.com/news/2009/09/14/4368300.htm, 2 pages.

Gansemer, et al., "RSSI-based Euclidean Distance Algorithm for Indoor Positioning Adapted for use in dynamically changing WLAN environments and multi-level buildings," 2010 International Conference on Indoor Positioning and Indoor Navigation(IPIN), Sep. 15-17, 2010, 6 pages.

Patent Cooperation Treaty, International Search Report for PCT/US2013/043107, Sep. 9, 2013, 5 pages.

\* cited by examiner

EXTENDING OUTDOOR LOCATION BASED SERVICES AND APPLICATIONS INTO ENCLOSED AREAS

CROSS REFERENCE TO EXISTING APPLICATIONS

This application is a continuation of U.S. patent application Ser. No. 12/809,603 filed on Jul. 26, 2010, which claims priority under 35 U.S.C. §365 of International Application No. PCT/IB08/055478 filed on Dec. 21, 2008, which claims the benefit of priority to U.S. Provisional Application No. 61/008,313 filed Dec. 20, 2007, the contents of which are relied upon and incorporated herein by reference in their entirety.

FIELD AND BACKGROUND OF THE INVENTION

A cellular phone is an exemplary "mobile unit", a general name used to describe an electronic device which communicates through one or more wireless links with other devices. A mobile unit can be moved from location to location, be positioned at a certain location, or be in continuous movement. Its location or "position" may be determined at any given moment. The term "positioning" describes the process of determining the location of the mobile unit.

There are two positioning concepts, known as "mobile unit-based" and "network-based". In "mobile unit-based positioning, the location of the mobile unit is determined in the mobile unit, using signals received by the mobile unit. GPS (Global Positioning System)-based positioning represents a specific example of mobile unit-based positioning. A GPS receiver in the mobile unit determines its location through measurement of the time of arrival of signals arriving from satellites. Upon activation, the GPS receiver scans for signals from at least four satellites. Due to the low level of the signals arriving from the satellites and the need to receive the signals directly and not through reflections, the GPS receiver needs a clear view of the sky to achieve a successful position fix. Consequently, the GPS operation is very limited inside buildings and other enclosed spaces.

The "network-based" positioning concept is based on measurement, by one or more receivers of a network, of signals emitted by the mobile unit and calculation of its location based on properties of the received signals. The network may be an outdoor (external) network (for positioning a mobile unit outdoors) or an indoor access point (AP) based network (for positioning a mobile unit indoors or "in a building"). Access points are communication devices installed in a building. In indoor AP network-based positioning, the location of the mobile unit is determined through identifying signals received at the APs from the mobile unit. The signals are relayed by each AP to an indoor location server which calculates the mobile unit position. External network-based and GPS-based positioning require good direct communication links with the mobile unit, a condition that usually can not be satisfied inside buildings. There is no known indoor "mobile unit based" positioning concept based on reception of signals from an AP network.

The positioning of mobile units may be used to enable wireless location-based services (LBS) or location-based applications (LBA), which are emerging as a new opportunity for mobile network operators and other entities to generate new revenue. Industry analysts predict very steep growth in LBS and LBA in the near future. Services such as driving directions, identifying closest banks or restaurants, or tracking people for safety or in emergency situations (via E-911 in North America and E-112 in Europe) are already deployed by wireless network operators. These LBSs and LBAs are mainly applied in outdoor environments.

Some LBSs and LBAs are also known in indoor environments. Examples include navigation in large enclosed areas such as airports and shopping malls; providing the location of an emergency caller to rescue forces and first responders; and complementing other outdoor location based services when the mobile unit is inside buildings and can be identified by the outdoor positioning system. There is a clear interest in extending current and future outdoor LBSs and LBAs to indoor environments. However, there is a major problem with such an extension: since outdoor LBSs and LBAs are based on outdoor positioning capabilities (e.g. GPS or network-based) and since the move indoors limits these outdoor positioning capabilities, outdoor LBSs or LBAs become impossible to apply or become useless indoors.

FIG. 1 shows the prior art relevant to outdoor positioning of a mobile unit using GPS. Each mobile unit (e.g. 102 and 102') is equipped with a main data link (MDL), which is a communication link used by the mobile unit for transferring data to and from a communication network (exemplarily a cellular network) based on wireless technology. While outdoors with clear view of the sky, the GPS receiver in each mobile unit receives the signals of multiple satellites 104, decodes their time of arrival and calculates the distance to each satellite. Since the location of each satellite is known at each moment, the GPS receiver can determine its location based on triangulation in a well-known way. Mobile unit 102 is capable of transmitting a message including its location to a base station (BTS) 106. Base station 106 can deliver the location of mobile unit 102 to an outdoor (also referred to herein as "external" or "remote") location server 108 through a communication network 110. The outdoor location server is used to process and implement outdoor LBSs and LBAs based on the location of a mobile unit, as mentioned above. The location of the mobile unit has an important role in each such service or application. When the mobile unit (marked as 102') is located inside a building 112, it cannot receive adequately the signal of the satellites and cannot have its location determined by GPS or by external network positioning.

FIG. 2 shows the prior art relevant to indoor positioning of a mobile unit using an AP network. A mobile unit 202 is located inside building 112. Access points 204 (shown as AP1, AP2, AP3 . . . APi) communicate with the mobile unit and provide information on the signal received from the mobile unit to an indoor location server 202, which determines the location of the mobile unit-based on the information received from one or more APs. In some embodiments, indoor location server 302 may further use the mobile unit location data to activate a LBS or LBA in the indoor environment.

In order to enable the continuation of external (outdoor) LBSs or LBAs inside enclosed spaces (indoor environments) using the same servers, data bases, "look and feel" etc., there is a need for and it would be advantageous to have methods and systems which use indoor positioning instead of outdoor positioning and which provide the indoor mobile unit location data to the server running the location based service or application. There is also a need for and it would be advantageous to have methods and systems that enable the mobile unit to toggle seamlessly between outdoor and indoor positioning, regardless of whether the outdoor positioning is network-based or mobile unit-based.

SUMMARY OF THE INVENTION

The invention discloses methods and systems for indoor mobile unit-based positioning and for seamlessly toggling a mobile unit positioning between outdoor positioning and indoor positioning. In general, indoor positioning methods (both mobile unit-based and network-based) include use of APs and are therefore referred to as "indoor AP-based positioning". Indoor mobile unit-based positioning makes use of reception of AP signals by the mobile unit and indoor AP network-based positioning makes use of reception of mobile unit signals by the APs. Also disclosed are methods for enabling LBSs or LBAs generated in an outdoor environment to be applied in an indoor environment based on the indoor positioning of a mobile unit. The methods and systems disclosed herein may also provide additional information related to the indoor location of the mobile unit (e.g. a floor, a room name or number or a hall name). The location of the mobile unit may be described by coordinates or by textual description.

A system of the invention can be configured and operated in several modes. The invention enables all described modes to identify, with high accuracy, the location of a mobile unit and to deliver to the mobile unit location based services or applications.

A system of the invention which supports the extension of the outdoor LBS and LBA to indoors includes the following: access points installed in the building, which communicate with the mobile unit, an added data link (ADL) and a distributed antenna system (DAS) or another type of system for enabling cellular communications inside the building. An ADL is an additional communication channel supported by components within the mobile unit. Exemplarily, the ADL may be based on PAN/LAN technologies such as "Bluetooth" or "WiFi". Hereinafter, "DAS" refers not only to a distributed antenna system but also to any system which distributes cellular signals in a building. Each mobile unit is also equipped with hardware (HW)/software (SW) or a combination of HW and SW which allows it, in some embodiments, to perform indoor mobile unit-based positioning or to use AP network-based positioning. Each mobile unit is further equipped with a "location support module" used for (but not limited to) the following functions: (a) if the location is obtained through AP network-based positioning, calculating the location and translating it to the required coordinate system; (b) inserting the location data into a GPS like message if the positioning system replaces the GPS system; (c) toggling between GPS based positioning to the indoor positioning system; and (d) harnessing the keys and display of the mobile unit for use with a specific LBS or LBA.

The indoor mobile unit-based positioning is done as follows: the APs are installed inside the building in a way such that each AP creates a small cell and transmits a beacon signal which includes information on its location. This information includes at least one of (but not limited to) the following types of data: (a) coordinates of the AP provided in any agreed datum system such as UTMS (Universal Transverse Mercator System), WGS-84 (World Geodetic System) or GRS-1980 (Geodetic Reference System); and (b) textual information such as floor designation, name or description of the area, hall, room, etc. Floors, areas, halls, rooms, etc are defined herein as "indoor entities" of an indoor environment. As an example, the location information provided by the AP may be in form of Y=12.45.34.34.23; X=56.55.82.98.52, X=56.55.82.98.52, Z=66.52.82.18.23 floor #2 GAP store. The software in the mobile unit, and more specifically the location support module scans the transmissions from the APs through the ADL. Once a beacon with location information is received from one or more APs, the location support module calculates the mobile unit location, based on the received information. The mobile unit location is then transferred through the DAS located in the building to a cellular network link, which relays the mobile unit location to an external location server (ELS). The ELS may then provide the mobile unit, while indoors, with location-based services or location-based applications normally provided, to the mobile unit while outdoors. The ELS may serve a mix of outdoor and indoor mobile units. In this case, the invention enables a seamless integration of the indoor elements in a wider location based system.

In some embodiments, there is provided a method for supplying a location based service or location based application generated in an outdoor environment to a mobile unit positioned in an indoor environment, comprising the steps of determining the mobile unit location, relaying data related to the mobile unit location through a DAS to an ELS and providing the location based service or location based application generated in the outdoor environment from the ELS to the mobile unit.

In some embodiments, there is provided a system for supplying a LBS or a LBA generated by an ELS in an outdoor environment to a mobile unit positioned in an indoor environment which includes an AP network and a DAS, comprising location data acquisition and processing means in the mobile unit for acquiring and processing data related to the mobile unit location in the indoor environment and a cellular link for transmitting at least some of the data related to the mobile unit location to the ELS and for transmitting the LBS or LBA from the ELS to the mobile unit.

BRIEF DESCRIPTION OF THE DRAWINGS

The invention is herein described, by way of example only, with reference to the accompanying drawings, wherein.

DETAILED DESCRIPTION OF THE INVENTION

A more complete understanding, as well as further features and advantages of the invention will be apparent from the following detailed description and the accompanying drawings.

Figure 3:
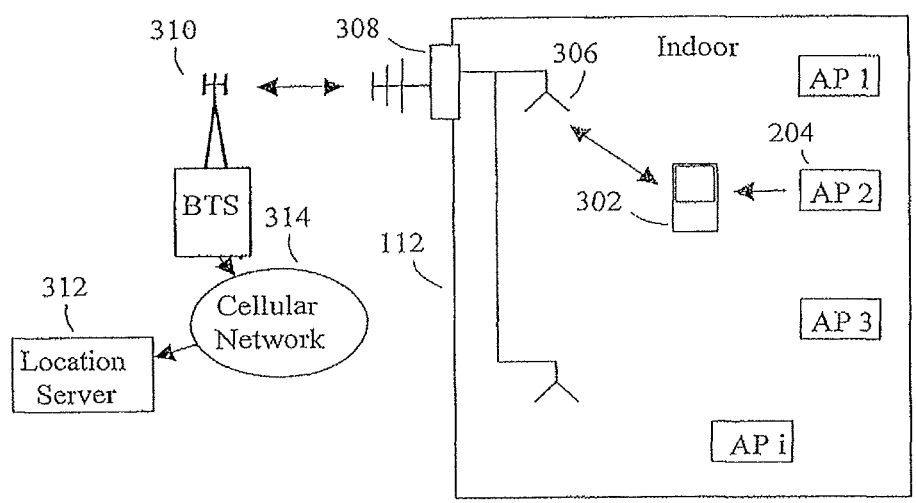
FIG. 3 shows an embodiment of a positioning system of the invention.

FIG. 3 shows an embodiment of a positioning system of the invention. A mobile unit 302 is located inside building 112. In some embodiments of a method for mobile unit positioning according to the invention, mobile unit 302 receives signals with location messages transmitted by APs 204 and self-determines its location based on location messages received from one or more of the APs. In other embodiments of a method for mobile unit positioning according to the invention, mobile unit 302 self-determines its location by evaluation of one or more properties of the signals transmitted by the APs (such as, but not limited to, signal strength, time of arrival and the like). In some embodiments, after determining its location, the mobile unit can transmit a message containing its location to an external network through an indoor DAS 306 connected to a repeater 308. Repeater 308 relays the message received from the DAS to a base station (BTS) 310, which further relays the message an external location server 312 through a communication (in this case cellular) network 314. In other embodiments, the signal of the mobile unit containing the message with its position may be provided directly from the DAS (distributed antenna system) to a base station installed inside the building (not shown) or close to the building, using a physical connection such as coaxial cable or a combination of coaxial cable and fiber-optic media (not shown).

Several algorithms can be used for calculating the mobile unit location in indoor mobile unit positioning. The simplest (and used exemplarily only) is based on AP signal strength. The algorithm assumes that the strength of a signal received from an AP is related to the distance of the mobile unit from the AP. If the signal of only one AP is received, then the algorithm decides that the location of the mobile unit is the location of the received AP. If signals of two or more APs are received, then the mobile unit uses the signal strength as a criterion for determining the relative distance from each AP and for calculating more accurately the location of the mobile unit. This calculation may exemplarily be done by triangulation, giving a higher "weight" to the location of the AP with the stronger signal.

The following is an example of another indoor mobile unit-based positioning algorithm, having as inputs the AP location. Assume that the location received by the mobile unit from AP1 is X1, Y1 and the location received from AP2 is X2, Y2. Assume also that the ratio between the signal strength (in decibels) of the signal received from AP1, to the signal strength (in decibels) of the signal received from AP2 is "G". The mobile unit calculates it position as $Xm=(G \times X1+X2)/(2 \times G)$; $Ym=(G \times Y1+Y2)/(2 \times G)$. In another example, an indoor mobile unit-based positioning algorithm may use a difference in the time of arrival of the signals from APs to determine respective distances from each AP.

Figure 1:
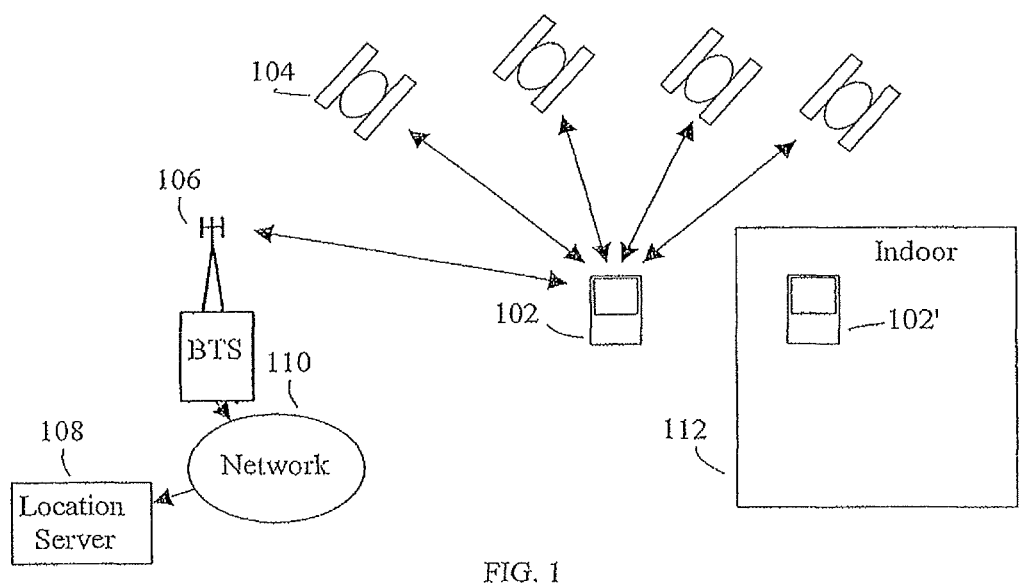
FIG. 1 shows the prior art relevant to outdoor positioning of a mobile unit.
Figure 2:
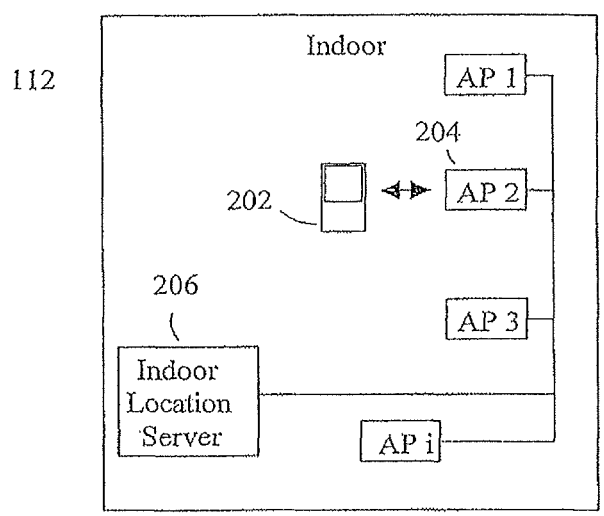
FIG. 2 shows the prior art relevant to indoor positioning of a mobile unit.
Figure 4:
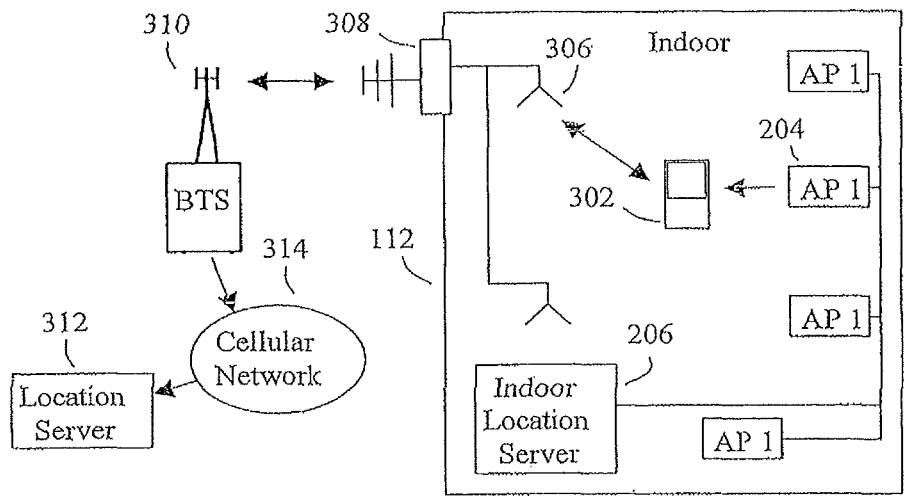
FIG. 4 shows another embodiment of a positioning system of the invention.

FIG. 4 shows yet another embodiment of a positioning system of the invention, which includes essentially the system described in FIG. 3, but in which the mobile unit location is determined by indoor location server 302 and provided to the mobile unit through the APs. The mobile unit location data is delivered from the mobile unit to ELS 312 through a cellular communication link similar to that shown in FIG. 2. This communication link includes indoor DAS 206 coupled with repeater 308, base station 310 and cellular network 314. While the mobile unit indoor location is determined by indoor location server 302 based on the information received from one or more APs, in contrast with prior art, a LBS or LBA is managed by ELS 312 and provided to the indoor mobile unit through the MDL (main data link), using the cellular network including BTS 310 and the DAS 306 or any other similar indoor distribution system for cellular communications.

Figure 5:
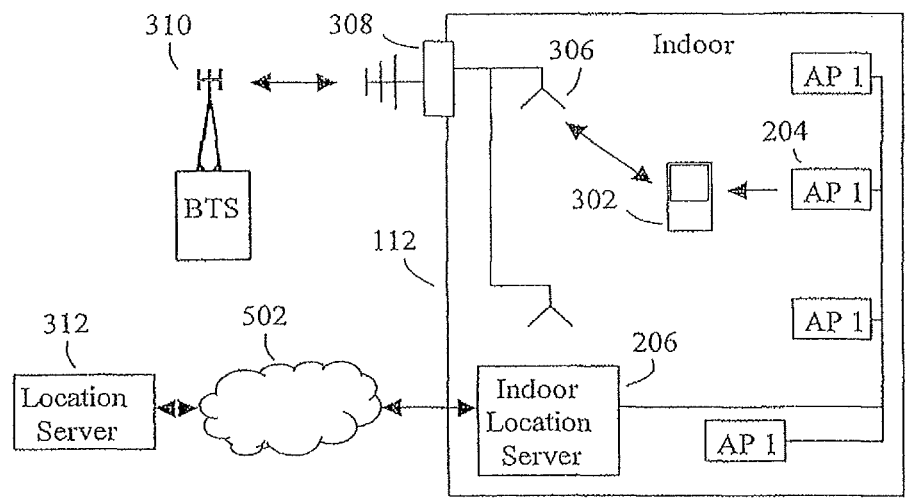
FIG. 5 shows yet another embodiment of a positioning system of the invention.

FIG. 5 shows yet another embodiment of a positioning system of the invention, similar to that in FIG. 4 but with a dedicated or public network 502 replacing cellular network 314 as means of transmitting data. All other components are identical in function and indicated by numerals identical with those in FIG. 4. In this embodiment, ELS 312 may be part of the cellular core network but can also be operated by another business entity. The location of the mobile unit may be determined either by the mobile unit (mobile unit-based positioning) or by the AP network in cooperation with the indoor location server (AP network-based positioning). As in the system of FIG. 4, in contrast with prior art, a LBS or LBA is managed by ELS 312 and provided to the indoor mobile unit either through the indoor location server 206 and the APs 204 or through the cellular communication link comprised of cellular network 314, BTS 310, repeater 308 and DAS 306. In some embodiments, DAS 306 may be replaced by a similar indoor distribution system used for cellular communications.

Figure 6:
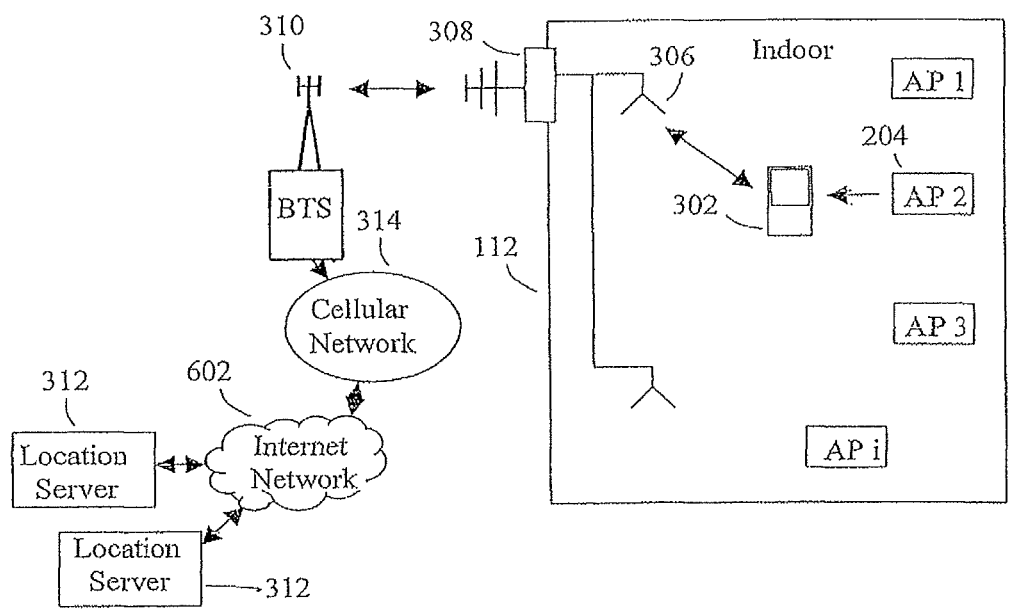
FIG. 6 shows yet another embodiment of a positioning system of the invention.

FIG. 6 shows yet another embodiment of a positioning system of the invention, similar to that in FIGS. 3 and 5. The main difference here is that, although the mobile unit location is electronically transmitted out of the building using the cellular link, ELS 312 is not a part of the cellular core network but belongs to another system or business entity. The connection between the cellular network and ELS 312 is realized through an Internet network ("web") 602, to which access is accomplished through cellular network 314. By accessing the web, it is possible for the user to connect to a variety of external location servers and to a variety of location based applications and services provided by a variety of business entities. All other components are identical in function and indicated by numerals identical with those in FIG. 3 and FIG. 5. As in previous embodiments, the BTS is used for communicating LBSs and LBAs to the mobile unit, from the external locations server through the Internet network ("web") 602 and through the cellular communication link comprised of cellular network 314, BTS 310, repeater 308 and DAS 306. In some embodiments, DAS 306 may be replaced by a similar indoor distribution system used for cellular communications.

Figure 7:
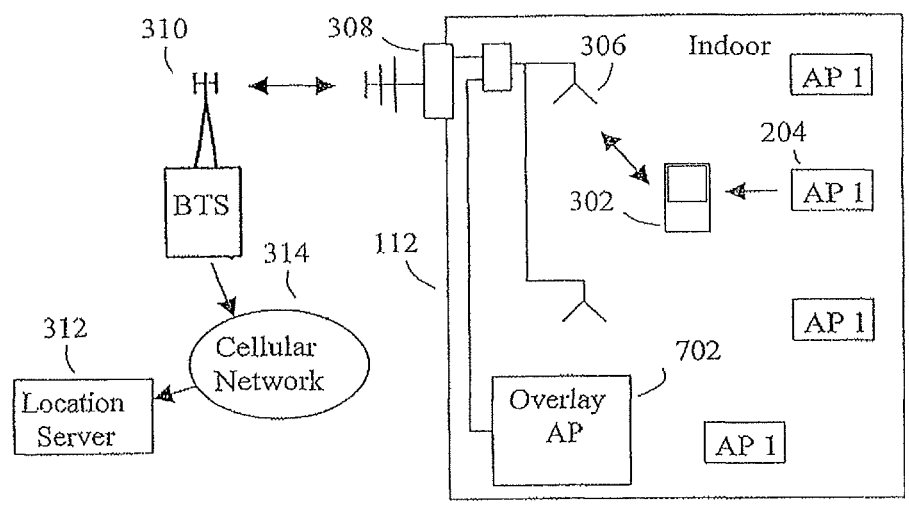
FIG. 7 shows yet another embodiment of a positioning system of the invention including an "overlay AP" link distributed all over the building through a distributed antenna system.

FIG. 7 shows yet another embodiment of a positioning system of the invention, which essentially includes the components shown in FIG. 3, plus an "overlay AP" 702. The access points transmit only beacons with their identification number (ID) to a mobile unit inside the building, allowing the mobile unit to self-determine its location (i.e. perform mobile unit-based positioning), as explained above. In this embodiment, the presence of the DAS may be used to simplify the operation of the APs and the communication between the mobile unit and the APs. The overlay AP provides a control channel which is broadcast through the DAS inside the building. This control channel is received by each mobile unit throughout the building. Through the control channel, each mobile unit can be offered to join a LBS provided in the building, or to be turned ON automatically Another important function that can be performed by the control channel is "pairing"—a process in which the ADL in the mobile unit identifies the existence of the location based capability in the building and approves its participation. A cross reference table which matches the identification numbers to descriptions of specific locations is downloaded from the overlay AP through the ADL to each participating mobile unit. This way, the mobile unit does not need to have a bidirectional communication with the APs, but only needs to receive and decode their signal.

Figure 8:
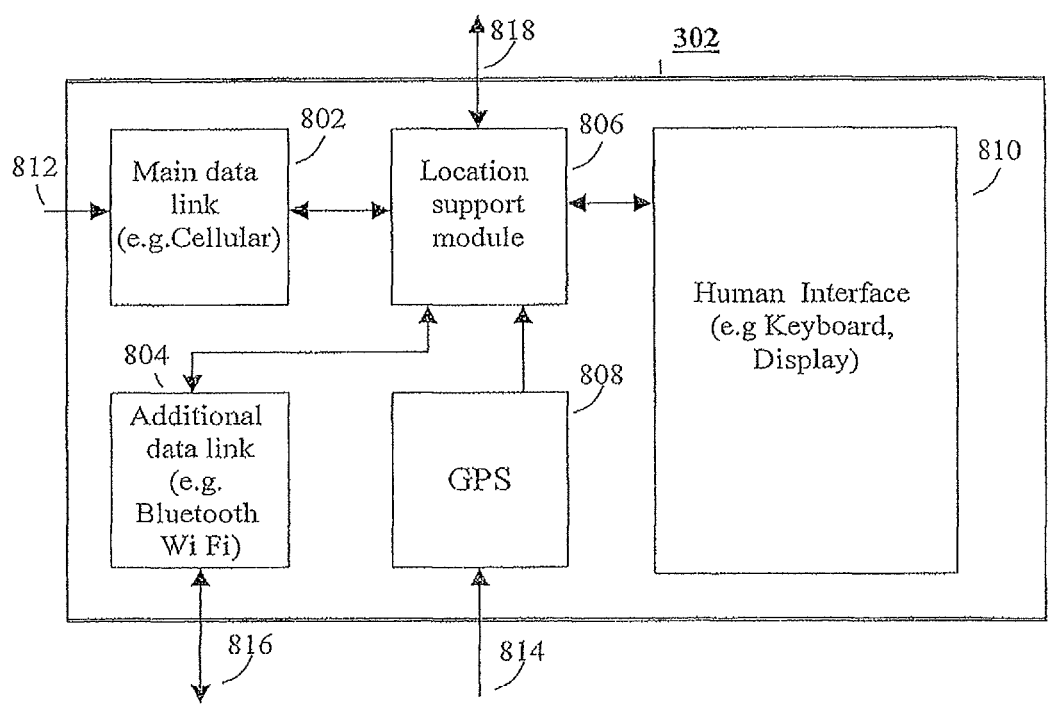
FIG. 8 shows the internal building blocks of a mobile unit.

FIG. 8 shows the internal building blocks of the mobile unit (realized by HW, SW or a combination of HW and SW) which support the functionality of the mobile unit as required by this invention. The internal building blocks of the mobile unit that support the positioning functionality are: a main data link 802, an additional data link 804, a GPS receiver 808, a human interface means (e.g. keys, display) 810 and a location support module 806 used for (but not limited to) the following functions: (a) if the location is obtained through the reception of the AP signals, calculating the location and translating it to the required coordinate system; (b) inserting the location data into a GPS like message if the positioning system replaces the GPS system; (c) toggling between GPS based positioning to the indoor positioning system; and (d) harnessing the keys and display of the mobile unit for use with a specific LBS or LBA. The mobile unit may have a physical connection 818 used to communicate data related to the LBS or LBA to external devices. Numeral 812 represents an antenna of the main data link, numeral 814 represents an antenna of the GPS and numeral 816 represents an antenna of the ADL.

Substitution of GPS Positioning

Figure 9:
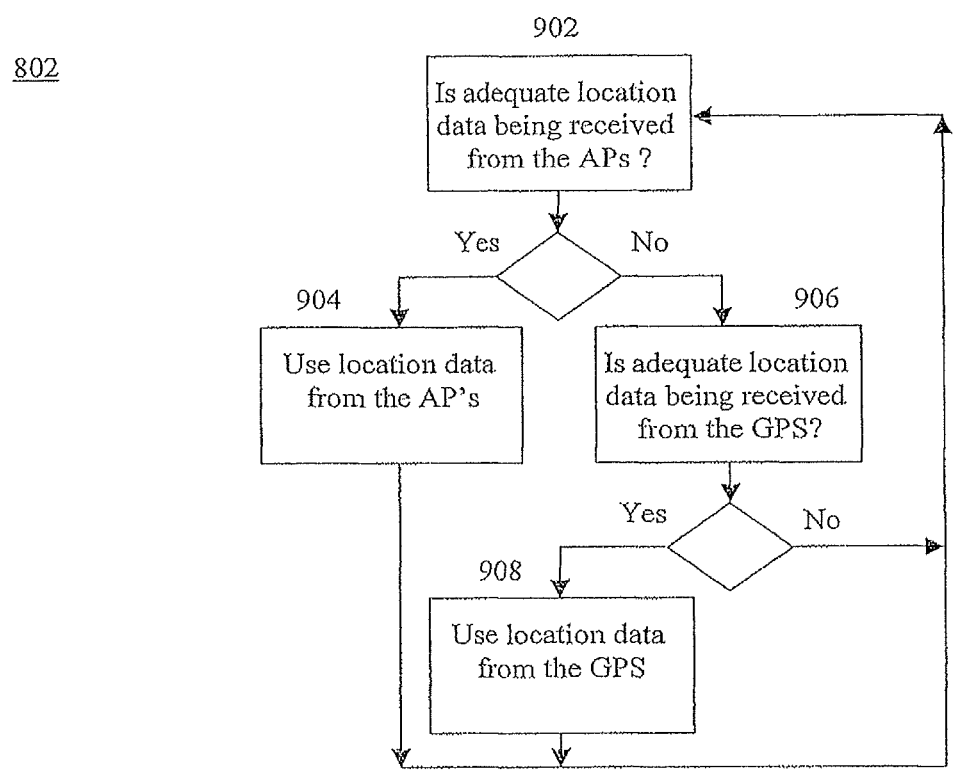
FIG. 9 describes the flow chart of a process for toggling a positioning System of the invention between GPS or AGPS based positioning and indoor AP-based positioning.

The invention includes a mechanism that enables to replace the GPS-based positioning by indoor AP-based positioning (referred to herein as "toggling"). FIG. 9 describes this toggling process, which applies also to Assisted GPS (AGPS)-based positioning. Both the output of GPS receiver 808 and the output of the ADL receiver are fed to the location service module. In step 902, the mobile unit checks whether it receives, through the ADL, location data transmitted by APs. If location data from APs is received ("yes"), then the mobile unit uses the data as is (in the case of AP-network-based positioning) or calculates its location in step 904. If no adequate location data from APs is received in check step 902 ("no"), then the mobile unit checks whether it receives location data from the GPS in step 906. If location data from the GPS is received ("yes"), the mobile unit uses the GPS data to determine its positioning in step 908. If no adequate location data from the GPS is received in check step 906 ("no"), the mobile unit returns to step 902 and tries again to get positioning data from APs. Similarly, the process loops back to step 902 after each of steps 904 and 908.

Substitution of Network-Based Positioning

In network-based positioning, the network is not expecting to get an explicit location data from the mobile unit but tries to determine the location of the mobile unit-based on properties of the signal of the mobile unit, received by one or more of the receivers of the network. According to the invention, the location application module is signaling the network through the MDL that the mobile unit is now served by an indoor positioning apparatus and provides the network the location of the mobile unit. The location application module includes a decision mechanism which operates according to the processes shown in FIG. 10. This mechanism is used to determine that AP's location data is available and inform the network that location data will be provided by the mobile unit.

Figure 10:
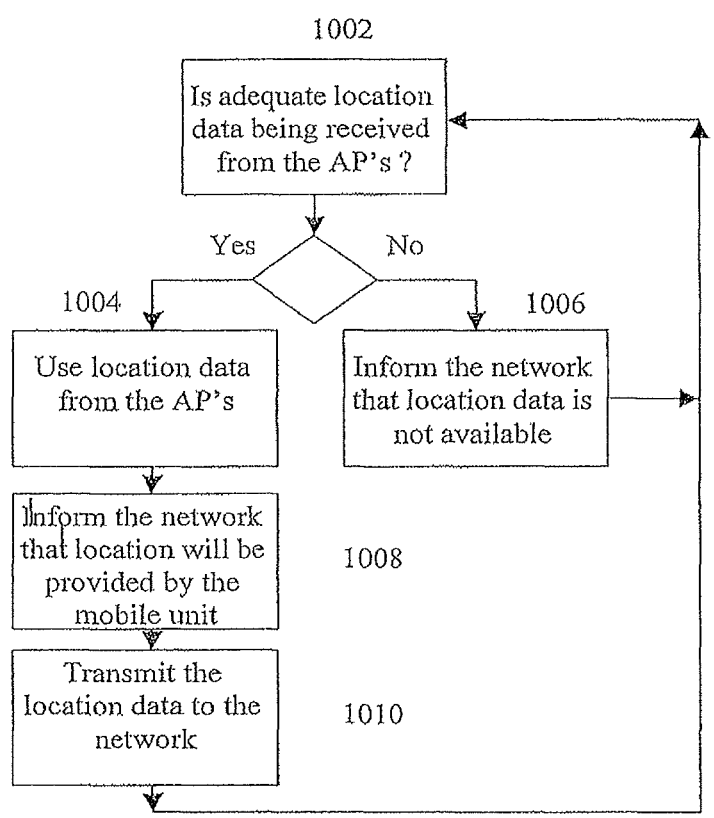
FIG. 10 describes the flow chart of a process for toggling a positioning system of the invention between outdoor network-based positioning and indoor AP-based positioning.

FIG. 10 describes the process for toggling a positioning system of the invention between outdoor network-based positioning and indoor AP-based positioning. In step 1002, the mobile unit checks whether it receives location data transmitted by APs. If location data from APs is received ("yes"), then the mobile unit uses the data as is (in the case of AP-network-based positioning) or calculates its location in step 1004. In step 1006 it informs the network-based positioning system (using the MDL) that the location data will be provided by the mobile unit. In step 1008 it transmits the location data to the network. If no adequate location data is received from APs in check step 1002 ("no"), then the mobile unit informs the network, using the MDL, that location data is not available in step 1010.

Translation of the location information generated by the indoor positioning system to "GPS based location information" format may be done through formulas and/or look up tables activated by a software algorithm, in ways well known in the art. A mobile unit of the invention translates the location data, generated by using the APs network to the format of the GPS location data and inserts this data into the messages between the mobile unit and the external location server, in the same format used for delivering GPS based location data. The location server can then process the location data in exactly the same way it processes GPS based location data. Since different systems may use different formats for communicating GPS location data, the mobile unit may include a translator to several formats.

Indoor High Granularity Specific Information

According to the invention, the indoor positioning data may include additional information that can not be described by coordinates. This additional information may be: floor designation, area of the building, name of the area, hall or room where the mobile unit is located and the like. This information may be very useful for LBSs or LBAs in an indoor environment.

According to the invention, the location data obtained by the indoor positioning system may include at least one of the following types of information: (a) coordinates provided in any agreed datum system; and (b) textual information such as floor designation, name or description of the area, hall, room etc. This information can be used by the location server to avoid wrong positioning that might occur due to some reflection scenarios and other disturbances to the signals used for positioning. The positioning algorithm correlates the previous locations with the new one and excludes unrealistic scenarios. For example, if in the last few seconds the mobile unit was located on floor #4 and suddenly, after a short time, due to disturbance to the signals used for the positioning, the mobile unit is found on floor #3, the algorithm "will be cautious" about this new position and may "want" to get a few more measurements before deciding that the mobile unit has moved from floor #4 to floor #3.

In summary, the invention enables to substitute GPS or outdoor network-based positioning with indoor AP-based positioning for a mobile unit in an indoor environment. In addition to the enablement of positioning inside buildings where external signals are strongly attenuated, the invention provides higher accuracy as well as positioning information like floor designation, area name, etc. The invention enables a mobile unit to be integrated in a location based application which usually uses a GPS receiver for generating the location data. By way of example, assume that Google provides an application for locating stores or services (bank etc.) while a mobile unit user is outdoors. Assume also that this application is supported by mobile units equipped with GPS. The invention enables to seamlessly extend the use of the same application to enclosed areas such as shopping malls and airports, where satellite signals can not be received. By "seamlessly" we mean that no change will have to be made in the original application and its supporting servers. By "integration" we mean that the AP-based positioning solution can be made a part of the already existing location based application.

While the invention has been described with respect to a limited number of embodiments, it will be appreciated that many variations, modifications and other applications of the invention may be made. What has been described above is merely illustrative of the application of the principles of the present invention. Those skilled in the art can implement other arrangements and methods without departing from the spirit and scope of the present invention.

We claim:

1. A system for supplying at least one of a location based service (LBS) and a location based application (LBA) generated by an external location server (ELS) in an outdoor environment to a mobile unit positioned in the indoor environment, comprising:
   an access point (AP) network at least partially located in the indoor environment;
   a distributed antenna system (DAS) at least partially located in the indoor environment and communicatively coupled to at least one of a base station and a repeater;
   a location support module for acquiring and processing data related to the mobile unit location in the indoor environment; and
   a cellular link for transmitting at least some of the data related to the mobile unit location to the ELS and for transmitting at least one of the LBS and the LBA from the ELS to the mobile unit, wherein
   the location support module performs toggling between AP-based positioning and at least one of GPS-based positioning and AGPS-based positioning,
   when the mobile unit moves from the outdoor environment to the indoor environment, the location support module toy ales from at least one of the GPS-based positioning and AGPS-based positioning to AP-based positioning,
   when the mobile unit moves from the indoor environment to the outdoor environment, the location support module toggles to at least one of the GPS-based positioning and AGPS-based positioning, and
   the data related to the mobile unit location includes a description of an indoor entity of the indoor environment.

2. The system of claim 1, wherein the indoor entity is selected from the group consisting of an area, a floor a hall and a room.

3. A system for supplying at least one of a location based service (LBS) and a location based application (LBA) generated by an external location server (ELS) in an outdoor environment to a mobile unit positioned in the indoor environment, comprising:
   an access point (AP) network at least partially located in the indoor environment;
   a distributed antenna system (DAS) at least partially located in the indoor environment and communicatively coupled to at least one of a base station and a repeater;
   a location support module for acquiring and processing data related to the mobile unit location in the indoor environment; and
   a cellular link for transmitting at least some of the data related to the mobile unit location to the ELS and for transmitting at least one of the LBS and the LBA from the ELS to the mobile unit, wherein
   the location support module performs toggling between AP-based positioning and at least one of GPS-based positioning and AGPS-based positioning,
   when the mobile unit moves from the outdoor environment to the indoor environment, the location support module toggles from at least one of the GPS-based positioning and AGPS-based positioning to AP-based positioning,
   when the mobile unit moves from the indoor environment to the outdoor environment, the location support module toggles to at least one of the GPS-based positioning and AGPS-based positioning, and
   the system further comprises an overlay AP configured to provide a control channel to be broadcast through the DAS inside the indoor environment.

4. The system of claim 3, wherein the control channel is configured to transmit an offer to a mobile unit to join a LBS.

5. A system for supplying at least one of a location based service (LBS) and a location based application (LBA) generated by an external location server (ELS) in an outdoor environment to a mobile unit positioned in the indoor environment, comprising:
   an access point (AP) network at least partially located in the indoor environment;
   a distributed antenna system (DAS) at least partially located in the indoor environment and communicatively coupled to at least one of a base station and a repeater;
   a location support module for acquiring and processing data related to the mobile unit location in the indoor environment; and
   a cellular link for transmitting at least some of the data related to the mobile unit location to the ELS and for transmitting at least one of the LBS and the LBA from the ELS to the mobile unit, wherein
   the location support module performs toggling between AP-based positioning and at least one of GPS-based positioning and AGPS-based positioning,
   when the mobile unit moves from the outdoor environment to the indoor environment, the location su ort module toggles from at least one of the GPS-based positioning and AGPS-based positioning to AP-based positioning,
   when the mobile unit moves from the indoor environment to the outdoor environment, the location support module toggles to at least one of the GPS-based positioning and AGPS-based positioning, and
   the AP-based positioning includes mobile unit-based positioning using AP signals.

6. The system of claim 5, wherein the location support module is located in the mobile unit.

7. A system for supplying at least one of a location based service (LBS) and a location basted application (LBA) generated by an external location server (ELS) to a mobile unit positions in an indoor environment, comprising:
   an access point (AP) network at least partially located in the indoor environment;
   a location support module for acquiring and processing data related to the mobile unit location in the indoor environment; and a cellular link for transmitting at least some of the data related to the mobile unit location to the ELS and for transmitting at least one of the LBS and the LBA from the ELS to the mobile unit, wherein
- the location support module performs toggling from AP-based positioning to at least one of GPS-based positioning and AGPS-based positioning when the mobile unit moves from the indoor environment to an outdoor environment, and
- the location support module performs toggling from at least one of GPS-based positioning and AGPS-based positioning to AP-based positioning when the mobile unit moves from the outdoor environment to an indoor environment, and wherein the system further comprises on overlay AP configured to provide a control channel inside the indoor environment, the control channel being configured to transmit an offer to a mobile unit to join a LBS.

8. The system of claim 7, wherein the data related to the mobile unit location includes a description of an indoor entity of the indoor environment, wherein the indoor entity is selected from the group consisting of an area, a floor, a hall and a room.

9. The system of claim 7, wherein the location support module is located in the mobile unit.

10. A system for supplying at least one of a location based service (LBS) and a location based application (LBA) generated by an external location server (ELS) to a mobile unit positioned in an indoor environment, comprising:
- an access point (AP) network at least partially located in the indoor environment;
- a distributed antenna system (DAS) at least partially located in the indoor environment and communicatively coupled to at least one of a base station and a repeater;
- a location support module for acquiring and processing data related to the mobile unit location in the indoor environment; and
- a cellular link for transmitting at least some of the data related to the mobile unit location to the ELS and for transmitting at least one of the LBS and the LBA from the ELS to the mobile unit wherein
  - the location support module performs toggling from AP-based positioning to external network-based positioning when the mobile unit moves from the indoor environment to and outdoor environment, and
  - the location support module performs togging from external network-based positioning to the AP-based positioning when the mobile unit moves from the outdoor environment to an indoor environment, wherein the system further comprises an overlay AP configured to provide a control channel to be broadcast through the DAS inside the indoor environment, the control channel being configured to transmit an offer to a mobile unit to join a LBS.

11. The system of claim 10, wherein the data related to the mobile unit location includes a description of an indoor entity of the indoor environment, wherein the indoor entity is selected from the group consisting of an area, a floor, a hall and a room.

12. The system of claim 10, wherein the location support module is located in the mobile unit.

* * * * *